(12) United States Patent
Bunce et al.

(10) Patent No.: US 6,290,257 B1
(45) Date of Patent: Sep. 18, 2001

(54) SAFETY SYSTEM FOR AUTOMOBILE

(75) Inventors: Michael Anthony Bunce, Oxford, OH (US); Kazuhiro Kaneko, Fuji (JP); Michitaka Suzuki, Fuji (JP); Toshiyuki Sugiyama, Fuji (JP); Masanori Narita, Yamato (JP); Mitsuo Ehama, Samukawa (JP)

(73) Assignees: Nihon Plast Co., Ltd.; Nissan Motor Co., Ltd., both of (JP)

( * ) Notice: Subject to any disclaimer, the term of this patent is extended or adjusted under 35 U.S.C. 154(b) by 0 days.

(21) Appl. No.: 09/361,827

(22) Filed: Jul. 27, 1999

(30) Foreign Application Priority Data

Jul. 27, 1998 (JP) .................................. 10-211490

(51) Int. Cl.$^7$ .................................................. B60R 21/28
(52) U.S. Cl. ........................................ 280/739; 280/735
(58) Field of Search ......................... 280/739, 740, 280/742, 738, 731, 733, 743.1, 735

(56) References Cited

U.S. PATENT DOCUMENTS

| 5,016,913 | * | 5/1991 | Nakajima et al. | ................... | 280/738 |
| 5,350,188 | * | 9/1994 | Sato | ..................... | 280/739 |
| 5,413,378 | * | 5/1995 | Steffens, Jr. et al. | ................. | 280/735 |
| 5,707,078 | * | 1/1998 | Swanberg et al. | ................... | 280/739 |
| 5,743,558 | * | 4/1998 | Seymour | ............................... | 280/739 |
| 5,853,192 | * | 12/1998 | Sikorski et al. | ..................... | 280/739 |
| 5,967,548 | * | 10/1999 | Kozyreff | ............................... | 280/735 |

FOREIGN PATENT DOCUMENTS

| 3-50566 | 5/1991 | (JP) . |
| 8-268213 | 10/1996 | (JP) . |

\* cited by examiner

*Primary Examiner*—J. J. Swann
*Assistant Examiner*—David R. Dunn
(74) *Attorney, Agent, or Firm*—Kilpatrick Stockton LLP

(57) ABSTRACT

A safety system includes a seatbelt apparatus for supporting a shoulder of a vehicle occupant, an airbag apparatus having an airbag body, and control means for controlling a sealing member. The airbag body is inflated to receive the occupant by gas introduced into the airbag body. The airbag body has first and second ports for exhausting the gas. The sealing member is disposed on the second exhaust port. The sealing member is set to either one of a first state where the gas is prevented from being exhausted from the second exhaust port and a second state where the gas is allowed to be exhausted. The sealing member is ordinarily set to the first state. The seatbelt apparatus outputs a seatbelt apparatus application signal to the control means when the seatbelt apparatus is applied to the occupant. The control means set the sealing means to the second state when the control means receives the seatbelt apparatus application signal.

6 Claims, 11 Drawing Sheets

SAFETY SYSTEM FOR AUTOMOBILE

BACKGROUND OF THE INVENTION

The present invention relates to a safety system, and particularly to a safety system for protecting a vehicle occupant sitting on a seat of an automobile.

Related safety systems for an automobile are provided with an airbag apparatus at a center of a steering wheel, at an instrument panel in front of a front passenger seat, at an upper portion of a back of a seatback of a front seat or the like (refer to Japanese Patent Application Laid-Open No. 8-268213 or Japanese Utility Model Application No. 3-50566). An airbag body of an airbag apparatus catches the body of a vehicle occupant moved forward due to a secondary collision in order to prevent him/her from being injured on a rapid acceleration/deceleration of an automobile such as in a case of a collision of an automobile.

SUMMARY OF THE INVENTION

However, there is not any consideration about whether or not a vehicle occupant is in a proper sitting position where he/she has been applied with a seatbelt apparatus in the above related arts.

In view of the above circumstances, an object of the present invention is to provide a safety system for an automobile which catches a vehicle occupant softly when a seatbelt apparatus is applied to the vehicle occupant and catches the occupant so as to reduce a secondary collision movement when the seatbelt apparatus has not been applied to the occupant.

In order to achieve the above object, a safety system of the present invention comprises a seatbelt apparatus for supporting a shoulder of a vehicle occupant; an airbag apparatus having an airbag body; and control means for controlling a sealing member. The airbag body is expanded by gas introduced into the airbag body and catches the occupant. The airbag body has first and second exhaust ports for exhausting the gas. The sealing member is disposed on the second exhaust port. The sealing member can be set to either one of a first state where the gas is prevented from being exhausted from the second exhaust port and a second state where the gas is allowed to be exhausted. The sealing member is ordinarily set to the first state. The seatbelt apparatus outputs a seatbelt apparatus application signal to the control means when the occupant has applied the seatbelt apparatus to the occupant. The control means sets the sealing member to the second state when the seatbelt apparatus application signal is received by the control means.

In the above configuration, when the seatbelt apparatus is being applied to the occupant, the occupant is rotated about the hip point of the occupant to be moved while the occupant is being supported by the seatbelt apparatus and strikes on the airbag body. In this state, impact energy acting on the airbag body is smaller than that in the state where the occupant is not being applied with the seatbelt apparatus. At this time, the control means receives the seatbelt apparatus application signal to set the sealing member to the second state, so that the second exhaust port of the airbag body is opened. Accordingly, when the internal pressure of the airbag body is increased by striking force of the occupant, gas is rapidly exhausted from not only the first exhaust port but also the second exhaust port, so that the airbag body becomes suitably deflated. In this way, the airbag body catches the occupant softly to absorb impact of the occupant.

Also, when the seatbelt apparatus is not applied to the occupant, movement of the occupant is not restricted, and means for protecting the body of the occupant is only the airbag apparatus. In this state, impact energy acting on the airbag body is larger than that in the state where the seatbelt apparatus is being applied to the occupant. At this time, the control means does not receive the seatbelt apparatus application signal and the sealing member is maintained in the first state, so that the second exhaust port of the airbag body is maintained in the closed state. Accordingly, when the internal pressure of the airbag body is increased by striking force of the occupant, the gas is exhausted from only the first exhaust port. In this way, a deflating amount of the airbag body which has been completely inflated is suppressed by a small amount, so that the airbag body catches the occupant such that a secondary collision movement of the occupant is suppressed to be in a small range, i.e. the occupant is maintained at a position where the occupant strikes on the airbag body.

Thus, according to the above configuration, as the airbag body catches the occupant appropriately depending upon whether or not the seatbelt apparatus is applied to the occupant, injury of the occupant is reduced as much as possible.

The sealing member may have a closing portion supported by the airbag body and closing the second exhaust port, and an engaging portion releasably engaging the closing portion and the control means with each other. The engaging portion in the first state is releasable from the control means and the engaging portion in the second state is maintained in an engaged state with the control means. When the engaging portion is in the first state and the airbag body inflates, the engaging portion is released from the control means and the closing portion is maintained in a state where the second exhaust port has been closed. When the engaging portion is in the second state and the airbag body inflates, the engaging portion is maintained in a state where it is engaged with the control means, and the closing portion is released from the second exhaust port to open the second exhaust port.

In the above configuration, when the control means detects the seatbelt apparatus application signal, the engaging portion is maintained in engagement with the control means. In this way, at a time of inflation of the airbag body, the closing portion supported by the airbag body is moved together with the airbag body and movement of the sealing member is restricted by the control means (the engaging portion). That is, the engaging portion serves to prevent inflation of the airbag body. When a balance of inflating force of the airbag body and preventing force of the engaging portion is lost, the closing portion is released from the second exhaust port, so that the second exhaust port is opened.

The control means may have receiving means for receiving the seatbelt apparatus application signal and a pawl engaging the engaging portion when the airbag body inflates in a state where the receiving means has received the seatbelt apparatus application signal.

In the above configuration, when the seatbelt apparatus is applied to the occupant, the pawl engages the engaging portion of the sealing member. In this way, at a time of inflation of the airbag body, the sealing member does not move together with the airbag body. When the seatbelt apparatus is not applied to the occupant, the pawl is put in a released state from the engaging portion. In this way, at a time of inflation of the airbag, sealing member moves together with the airbag body.

The second exhaust port may be formed on a sewn portion positioned at a peripheral portion of the airbag body.

In the above configuration, it is unnecessary to form the second exhaust port on the airbag body separately. In this way, increase in cost for forming the second exhaust port can be suppressed, and freedom for layout for an airbag body is enlarged.

The airbag apparatus may have a cover member covering the airbag body and ruptured by inflation of the airbag body. The control means may have a bracket supporting the pawl. The engaging portion may be disposed to be movable between the cover member and the bracket.

In the above configuration, since an exclusive area for disposing the engaging portion of the sealing member is not required, the airbag apparatus can be small-sized.

DESCRIPTION OF THE PREFERRED EMBODIMENTS

Figure 1:
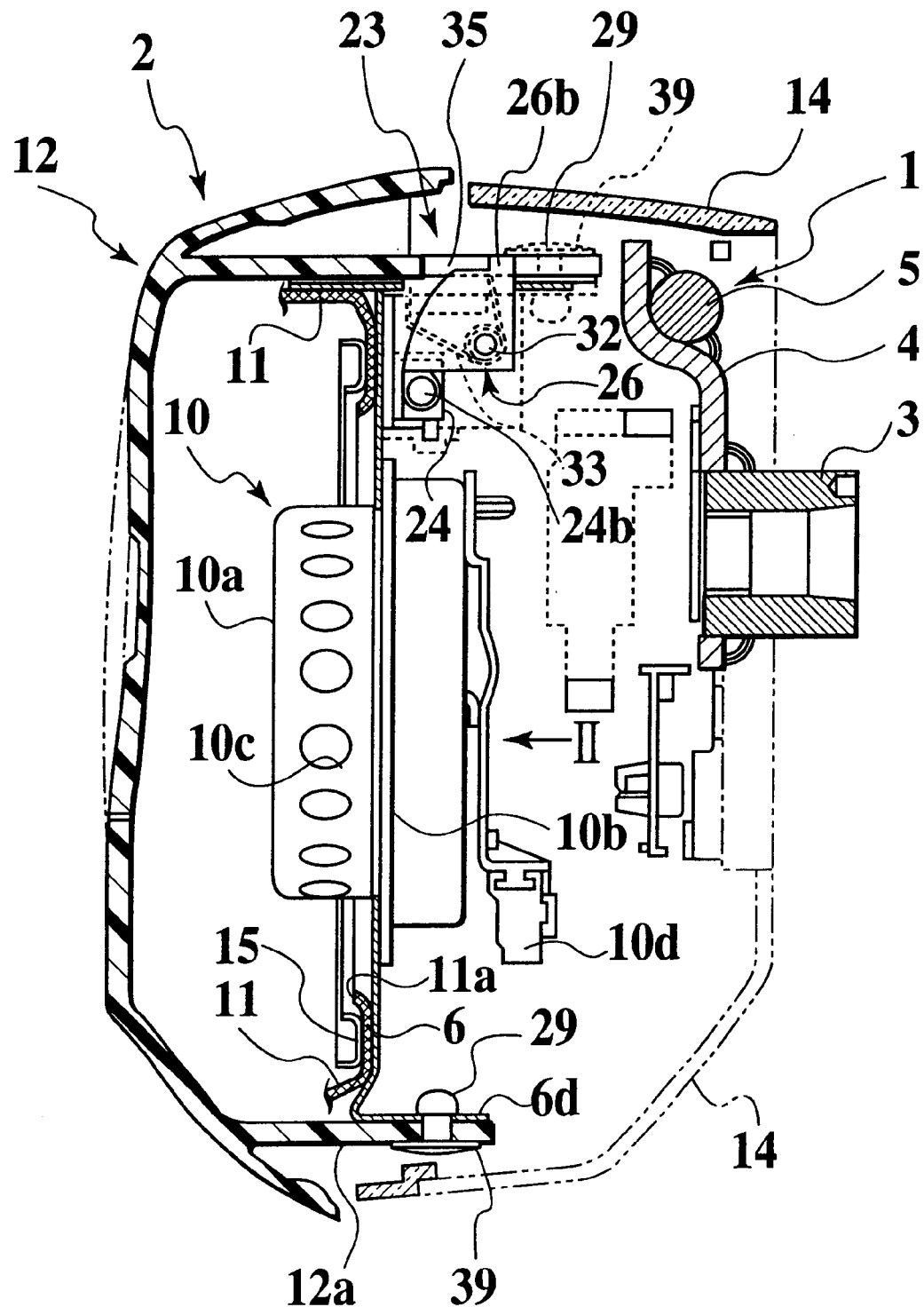
FIG. 1 is a cross section showing an airbag apparatus according to a first embodiment of the present invention.
Figure 2:
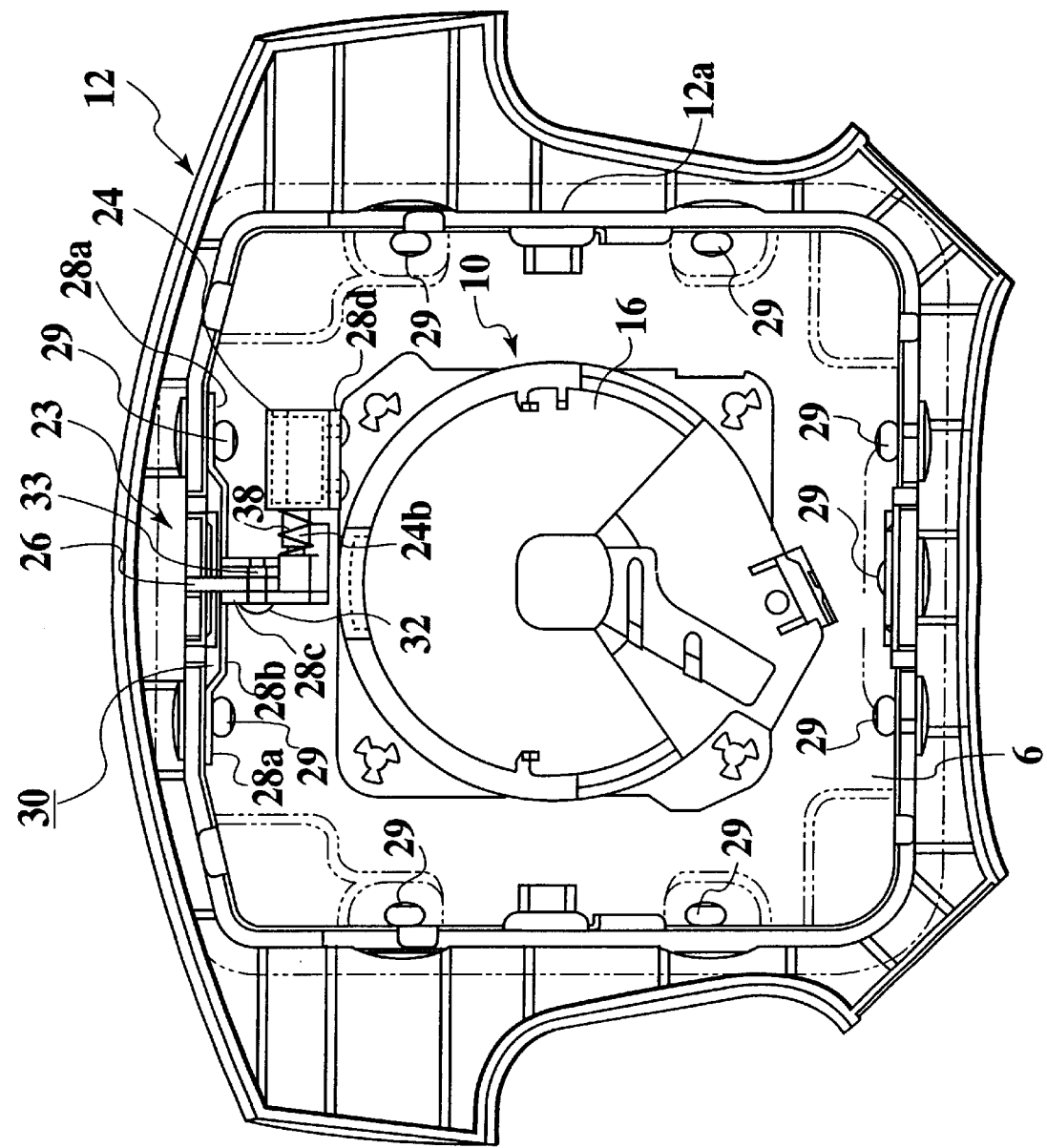
FIG. 2 is a front view seen from arrow II direction in FIG. 1.

Embodiments of the present invention will be explained below with reference to the drawings. In the respective embodiments, common portions or parts are denoted by the same reference numerals and overlapping explanation will be omitted.

FIGS. 1 to 9 show a first embodiment of the present invention. FIG. 1 is a cross section of an airbag apparatus 2 disposed in a steering wheel 1. A boss 3 of the steering wheel 1 is fixed to a steering post (not shown). The boss 3 supports a boss plate 4, and the boss plate 4 supports a spoke core 5. The boss plate 4 supports a base plate 6 by means (not shown). The base plate 6 supports the airbag apparatus 2.

The airbag apparatus 2 comprises an inflator 10, an airbag body 11, a cover member 12, control means 13, and a back cover 14.

The inflator 10 comprises a body 10a inserted into an opening 6a of the base plate 6 and a flange portion 10b supported on a back face 6c of the base plate 6. The body 10a has injection holes 10c for injecting gas G generated when powder (not shown) is ignited. The respective injection holes 10c are disposed to be opposed to the inside of the airbag body 11. A connector 10d is electrically connected to an impact detecting sensor and an airbag control device (not shown). The flange portion 10b contacts with the back face 6c side of the base plate 6, and it is supported together with the airbag body 11 by stud bolts 15a and nuts 17 described later. An inflator cover 16 made of synthetic resin and covering a lower side of the inflator 10 (the lower side in a case where a side where the injection holes 10c are formed is an upper side) is also supported by the stud bolts 15a and the nuts 17.

Figure 3:
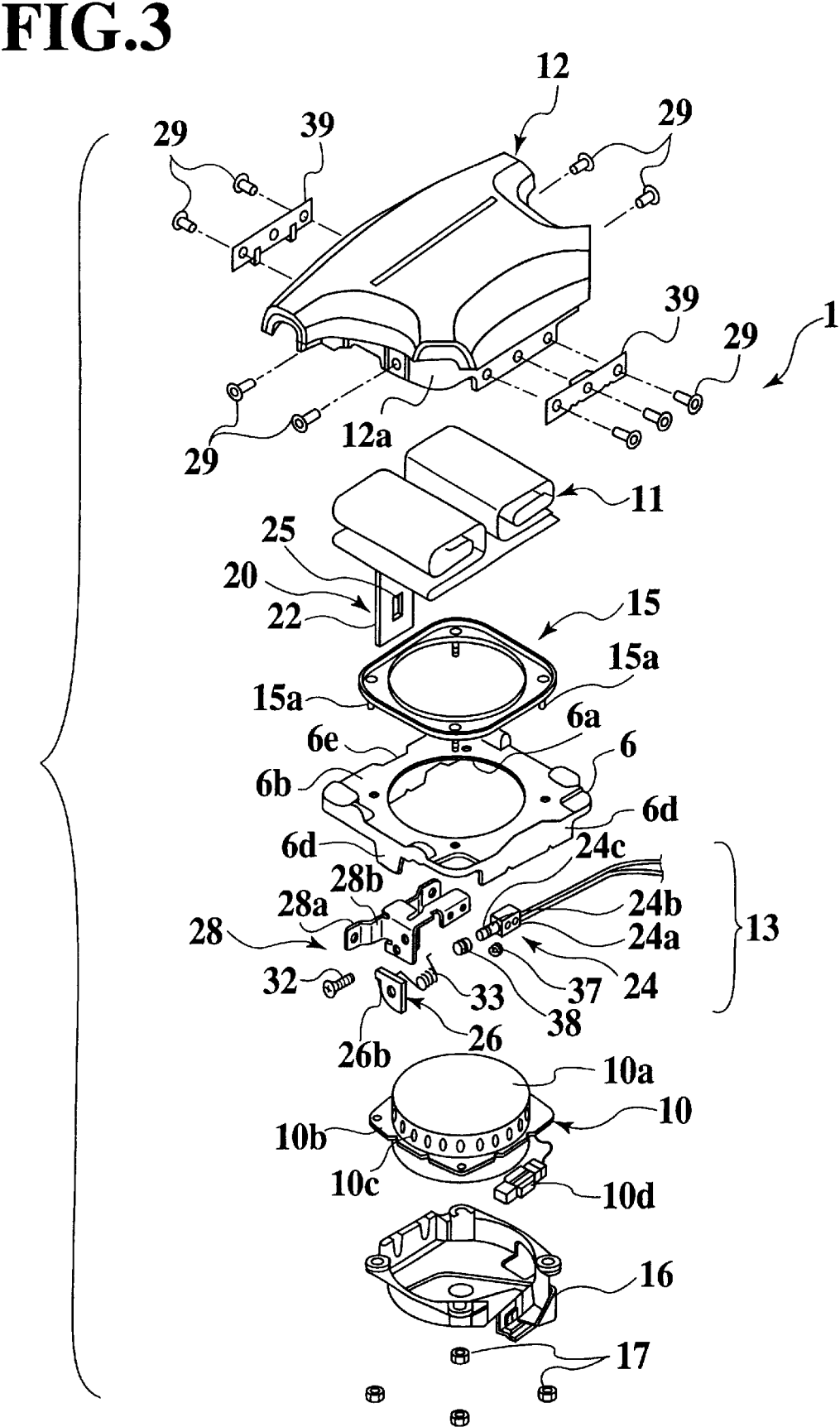
FIG. 3 is an exploded perspective view of the airbag apparatus in FIG. 1.

The airbag body 11 is prepared by forming a base cloth made of 66 nylon or 66 nylon applied with silicon coating, aramid fiber, carbon fiber or the like in a bag shape, in view of heat resistibility and pressure tightness. As shown in FIG. 3, the airbag body 11 is folded in an ordinary time. A retainer 15 disposed on a side of an upper face 6b of the base plate 6 has the stud bolts 15a. The stud bolts 15a inserted in an edge portion 11a of a gas introducing hole 11a of the airbag body 11 are screwed into the nuts 17. Thereby, the retainer 15 is fixed to the base plate 6 in a state where the gas introducing hole 11a of airbag body 11 is pressed onto the upper face 6b of the base plate 6. The gas introducing hole 11a is disposed at a position opposed to the inflator 10, and the gas G injected from the inflator 10 flows into the airbag body 11. The airbag body 11 is inflated by introducing the gas G in the airbag body 11 so that it can support the occupant.

Figure 4:
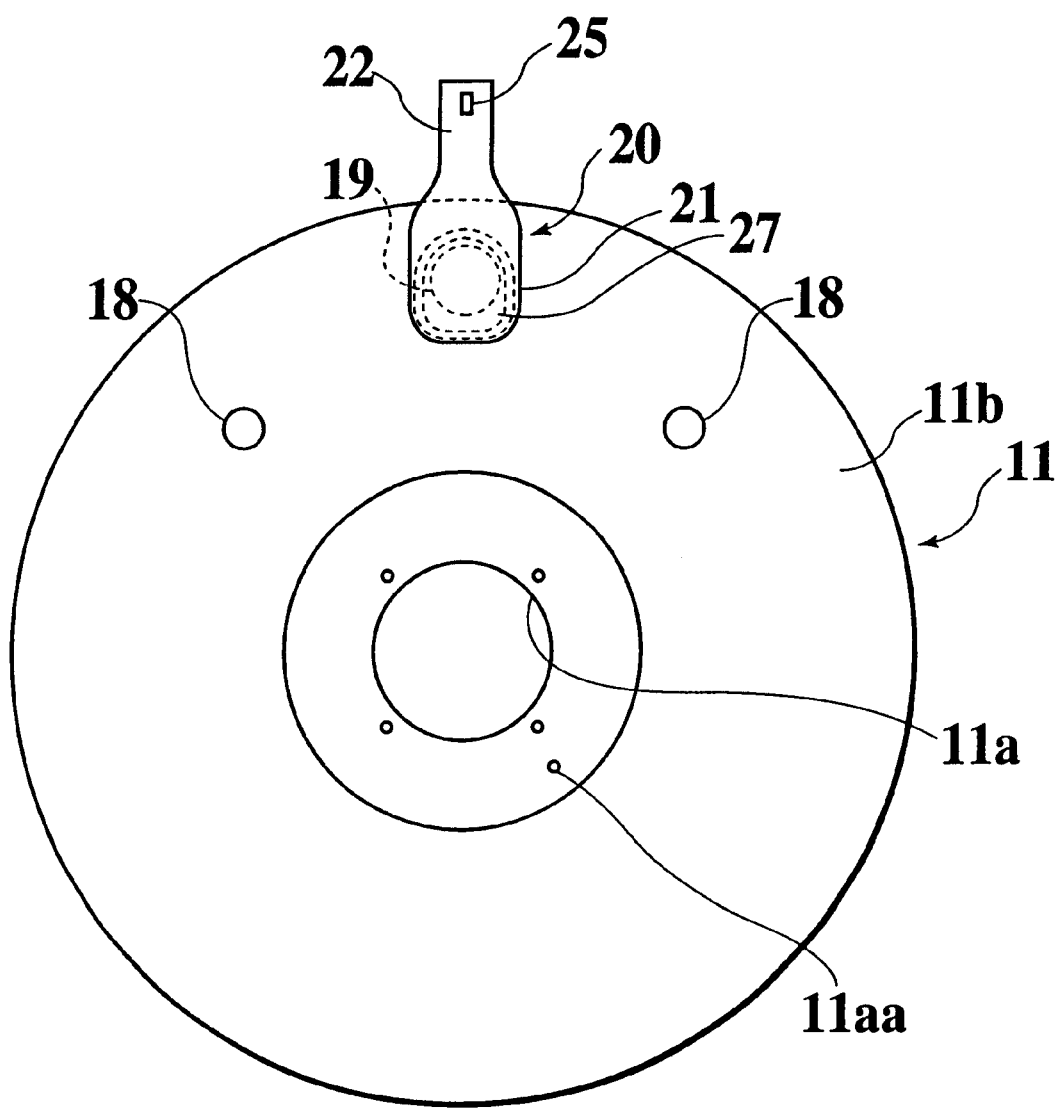
FIG. 4 is a front view seen from arrow II direction of an airbag body in FIG. 1.

As shown in FIG. 4, first exhaust ports 18, 18 and a second exhaust port 19 are provided on a back face 11b (namely, a face which is not opposed to an occupant) of the airbag body 11. The first exhaust ports 18, 18 can always exhaust the gas G introduced into the airbag body 11. The second exhaust port 19 has a larger area than each of the first exhaust ports 18, 18 and it can exhaust the gas G selectively.

A belt-like sealing member 20 is disposed on the second exhaust port 19. The sealing member 20 is closed in an ordinary time and it is maintained in a state where the gas G is prevented from being exhausted. The sealing member 20 is provided with a patch portion 21 serving as a closing portion and an engaging piece 22 serving as an engaging portion. The hatch portion 21 closes the second exhaust port 19 and it is supported around its entire periphery by a stitch 27. The engaging piece 22 extends from the airbag body 11 outwardly, and it has an engaging hole 25 releasable from control means 13.

The control means 13 comprises a central control unit 36 receiving a seatbelt apparatus application signal and a seatbelt apparatus non-application signal from a signal generating unit 35 and serving as signal receiving means, a solenoid 24 subjected to ON/OFF control by the central control unit 36, and a pawl 26. The seatbelt apparatus 7 is provided with the signal generating unit 35.

Figure 6:
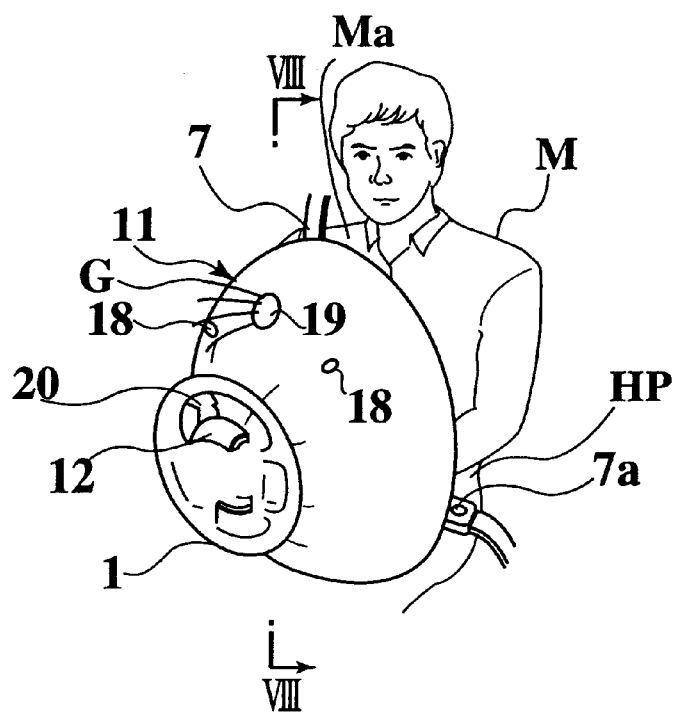
FIG. 6 is a perspective illustration showing inflation of an airbag body in a seatbelt apparatus application state.
Figure 7:
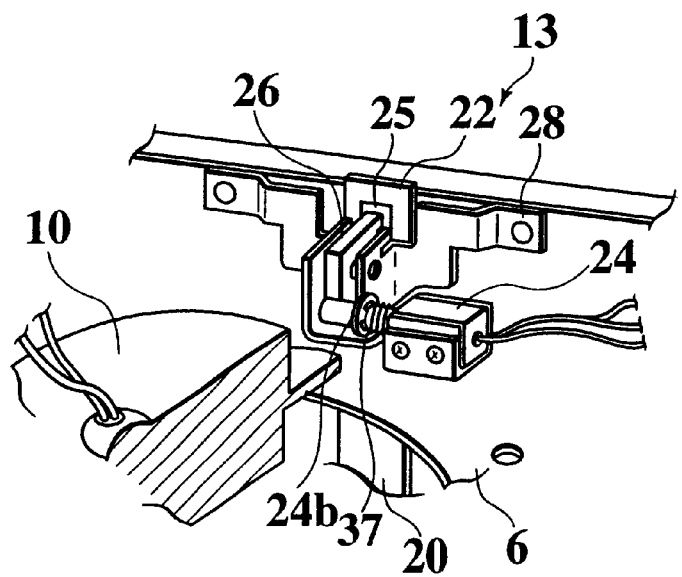
FIG. 7 is a perspective view showing operation of control means in a state where the seatbelt apparatus is applied to the occupant.
Figure 10:
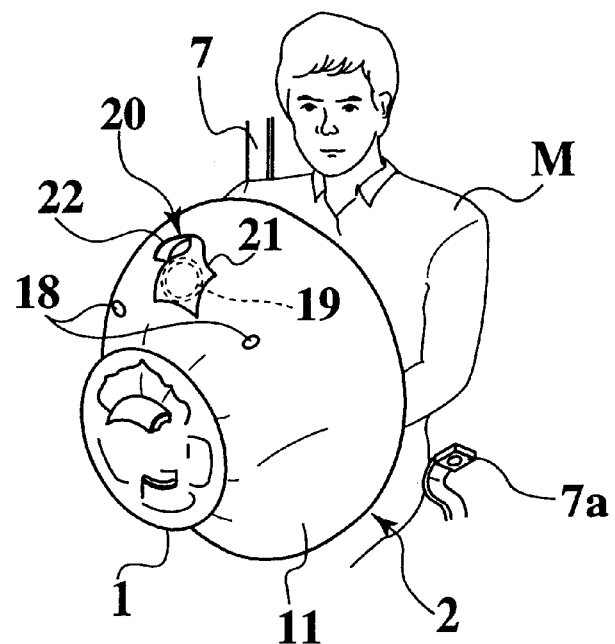
FIG. 10 is a perspective illustration showing inflation of the airbag apparatus in a seatbelt apparatus non-application state.

The signal generating unit 35 generates a seatbelt apparatus non-application signal when a buckle device 7a of the seatbelt apparatus 7 is not engaged with a tongue plate (not shown), as shown in FIG. 10, and it generates a seatbelt apparatus application signal when the buckle device 7a is engaged with the tongue plate, as shown in FIG. 6.

The pawl 26 is always urged by a torsion spring 33 described later in a direction in which it is engaged with the engaging hole 25 of the sealing member 20. When the sealing member 20 is pulled by inflation of the airbag body 11, it can be rotated. When the sealing member 20 is rotated, the pawl 26 can be released from the engaging hole 25 of the sealing member 20.

Particularly, a bracket 28 is caulked at its both end portions 28a, 28a to a base portion 12a of a cover member 12 and a side face 6d of the base plate 6 by rivets 29, 29 so as to be supported. A step recessed portion 28b forming a clearance 30 between the side face 6d of the base plate 6 and the same is formed between the both end portions 28a, 28a of the bracket 28. The engaging portion 22 of the sealing member 20 is disposed in the clearance 30 so as to be movable forward and rearward.

Rising pieces 28c, 28c are formed at a central portion of the step recessed portion 28b. A pin 32 is inserted into first through holes 31, 31 respectively formed on the rising pieces 28c, 28c to be supported by the rising pieces 28c, 28c. One rising piece 28c is formed with a second through hole 40. A rod 24 of the solenoid 24 can be engaged with the second through hole 40.

The pin 32 is rotatably supported in a through hole 26a of the pawl 26, and passes through the torsion spring 33. The torsion spring 33 urges a protrusion 26b of the pawl 26 to enter in openings 34 respectively formed in the cover member 12 and the side face 6d of the base plate 6.

When the central control unit 36 of the control means 13 detects a seatbelt apparatus application signal from the seatbelt apparatus 7, a state supporting the engaging portion 22 is maintained. In this way, in the course of inflation of the airbag body 11, the stitch 27 of the patch portion 21 of the sealing member 20 is ruptured from the second exhaust port 19 of the airbag body 11 so that the second exhaust port 19 is opened.

A solenoid body 24a of the solenoid 24 is supported on a fixing portion 28d of the bracket 28. A rod 24b is provided in the solenoid 24 to be movable forward and rearward. An E-ring 37 is fitted in a groove portion 24c formed on the rod 24b. A coiled spring 38 is disposed between the E-ring 37 and the solenoid body 24a. The coiled spring 38 urges the rod 24b in a projecting direction.

Figure 5:
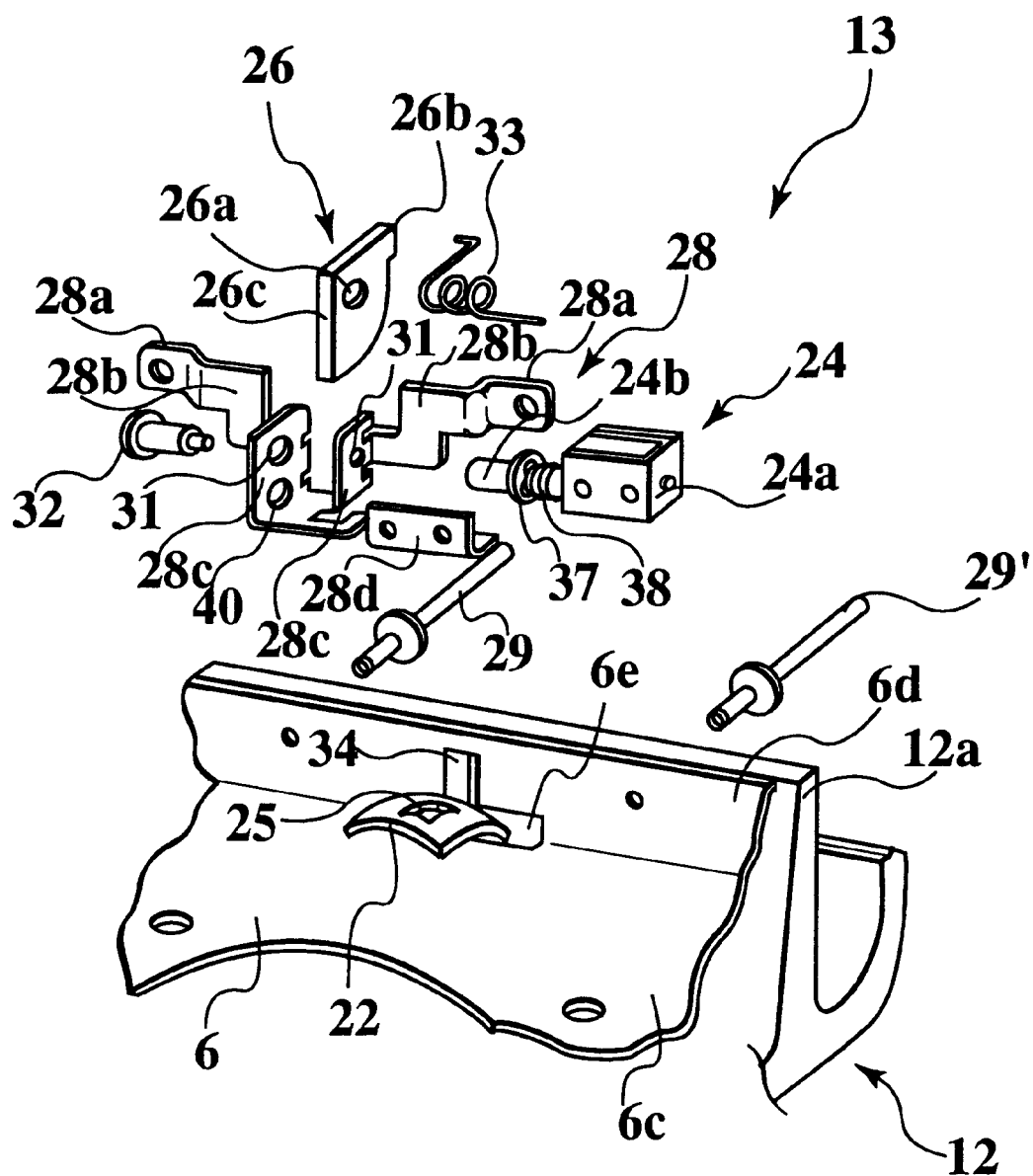
FIG. 5 is an exploded perspective view of a main portion in FIG. 2.

As shown in FIGS. 3 and 5, an insertion hole 6e is formed on a face of the side faces 6d of the base plate 6 where the sealing member 20 is moved forward and rearward. As shown in FIG. 3, a plate-shaped reinforcement member 39 is disposed along a base portion 12a of the cover member 12.

Next, operation of the safety system of the present invention, particularly inflation of the airbag body 11 of the airbag apparatus 2, at a time of rapid acceleration/deceleration such as a collision time from a front of an automobile will be explained.

APPLICATION STATE OF SEATBELT APPARATUS 7

As shown in FIG. 6, when a vehicle occupant M is put in a state where the tongue plate is fitted into the buckle device 7a of the seatbelt apparatus 7, the occupant M rotates about his/her hip point HP and moves to strike on the airbag body 11 while a shoulder portion Ma is being supported. Impact energy acting on the airbag body 11 in this state is smaller than that in a state where the tongue plate is not fitted into the buckle device 7a.

When a rapid acceleration/deceleration occurs by a collision from the front of the automobile or the like, chemical agent accommodated in the inflator 10 is combusted and the gas G having a high temperature and a high pressure is injected from the injection holes 10c.

The injected gas G enters into the airbag body 11 from the gas introducing hole 11a to inflate the airbag body 11. Upon inflation of the airbag body 11, the patch portion 21 of the sealing member 20 supported on the airbag body 11 by the stitch 27 is moved together with the airbag body 11.

The control means 13 detects a seatbelt apparatus application signal of the buckle device 7a of the seatbelt apparatus 7. In the central control unit 36 which has received the seatbelt apparatus application signal, the rod 24b of the solenoid 24 projects from the solenoid body 24a and it is inserted into the second through hole 40 of the bracket 28. The control means 13 detects whether or not the output from the signal generating unit 35 changes from the seatbelt apparatus application signal to a non seatbelt apparatus application signal sequentially in a feed-back manner.

The protrusion 26b of the pawl 26 is put in the engaging hole 25 of the sealing member 20. When inflation force of the airbag body 11 acts on the protrusion 26b of the pawl 26 via the engaging piece 22 of the sealing member 20, rotational movement of the end face 26c opposed to the protrusion 26b is prevented by the rod 24b of the solenoid 24. That is, the pawl 26 is maintained at a position where it is engaged with the engaging hole 25. The rod 24b of the solenoid 24 is moved forward and rearward in a direction crossing the rotational movement of the pawl 26, so that the fixing portion 28d of the bracket 28 and the second through hole 40 can securely hold the rod 24b of the solenoid 24. In this way, the solenoid 24, even when it is small-sized, can receive a rotational force of the pawl 26 against a large inflating force of the airbag body 11 acting on the pawl 26 via the sealing member 20.

Figure 8:
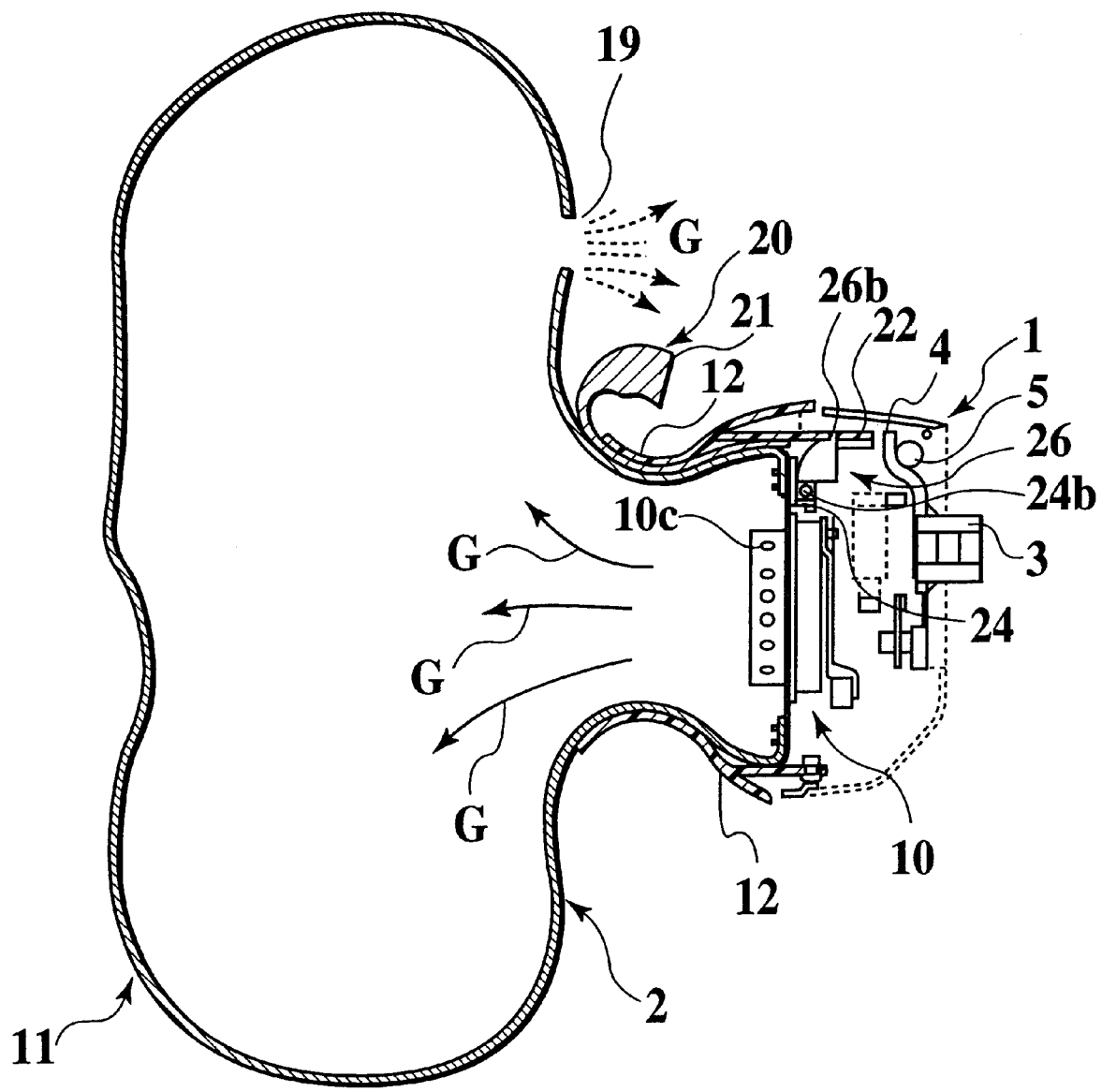
FIG. 8 is a cross section taken along line VIII—VIII in FIG. 6.
Figure 9:
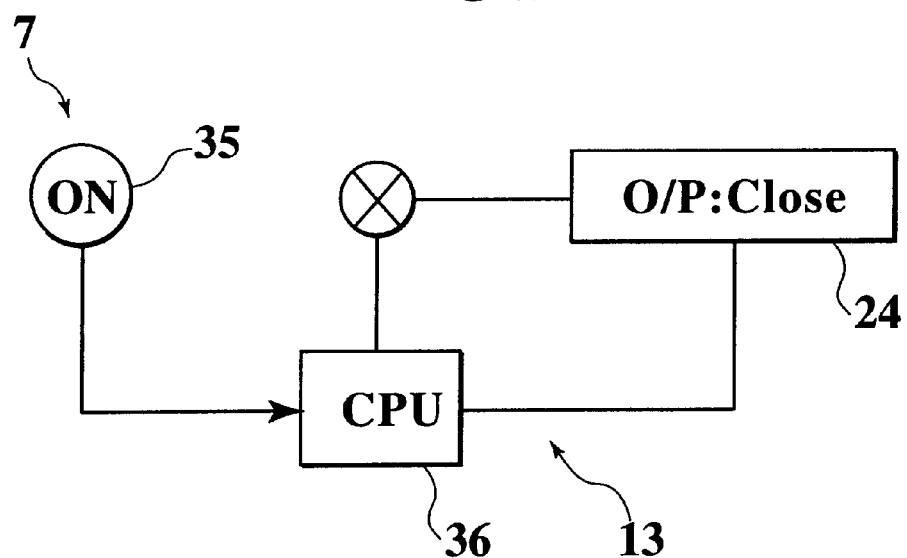
FIG. 9 is a diagram of a circuit of the control means in FIG. 7.

When the sealing member 20 is pulled from its both sides by the inflating force of the airbag body 11 and a predetermined position holding force of the engaging piece 22, the stitch 27 of the patch portion 21 which is the weakest supporting means is ruptured. When the stitch 27 is ruptured, the sealing member 20 is separated from the second exhaust port 19 of the airbag body 11, so that the second exhaust port 19 is opened, as shown in FIGS. 6 and 8.

In such a state, when the occupant M strikes on the inflated airbag body 11, the internal pressure of the airbag body 11 is increased by the striking force. However, the gas G is exhausted through not only the first exhaust ports 18 but also the second exhaust port 19. That is, since the airbag body 11 becomes deflated appropriately from a fully inflated state in a state where an exhaust resistance of the gas is small, the airbag body 11 catches the occupant M softly. Namely, impact of the occupant M is absorbed securely and a so-called rebound of the occupant M such as a state where, after the occupant M is rapidly moved to the front side due to a secondary collision, he/she is pushed away rearward again is securely prevented.

NON-APPLICATION STATE OF SEATBELT APPARATUS 7

As shown in FIG. 10, when the occupant M does not fit the tongue plate into the buckle device 7a of the seatbelt apparatus 7 and the control means 13 receives a non application signal, the seatbelt apparatus 7 does not restrict movement of the occupant M. In this state, movement of the occupant M due to a secondary collision of the occupant M is prevented only by the airbag apparatus 2. Therefore, impact energy generated by the occupant M is larger than that in a state where the seatbelt apparatus 7 is applied to the occupant M.

When the control means 13 detects a non-application signal of the seatbelt apparatus 7, the second exhaust port 19 of the airbag body 11 is maintained in the closed state. When the occupant M strikes on the inflated airbag body 11, the internal pressure of the airbag body 11 is increased by the striking force. However, the gas G is exhausted from only the first exhaust ports 18. Therefore, a deflating amount of the fully inflated airbag body 11 is smaller than that in a case where the second exhaust port 19 is also opened in addition to the first exhaust ports 18. Accordingly, the airbag body 11 catches the occupant M so as to reduce a secondary movement of the occupant M (so as to hold the occupant M at a position where he/she strikes on the airbag body 11 as much as possible).

Next, explanation will be given of maintaining the second exhaust port 19 of the airbag body 11 in the above-mentioned closed state.

In the central control unit 36 which has received a non-application signal of the seatbelt apparatus 7, the rod 24b of the solenoid 24 is retracted into the solenoid body 24a or it is moved at a position where it does not at least projects against the coiled spring 38. Namely, the pawl 26 is put in a state it can be rotated against the torsion spring 33.

When the gas G flows into the airbag body 11 so that the airbag body 11 begins to inflate, the sealing member 20 supported on the airbag body 11 begins to move to a predetermined position according to inflation of the airbag body 11. Inflating force of the airbag body 11 generated by the gas G and inflation preventing force due to engagement of the pawl 26 act on the sealing member 20.

When a balance of the inflating force and the inflation preventing force is lost and a force by which the engaging piece 22 of the sealing member 20 is pulled in an inflating direction of the airbag body 11 is increased, an urging force moving the protrusion 26b of the pawl 26 in a downward direction on FIG. 10 acts on the engaging portion 25 of the engaging piece 22. The pawl 26 is rotated in a direction of arrow 100 in FIG. 11 against the torsion spring 33 by the urging force.

Figure 11:
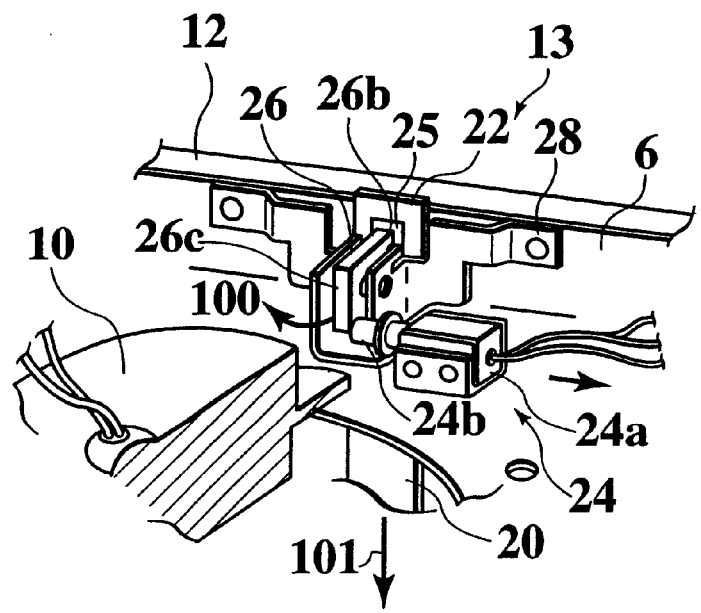
FIG. 11 is a perspective view showing operation of the control means in a seatbelt apparatus non-application state.
Figure 12:
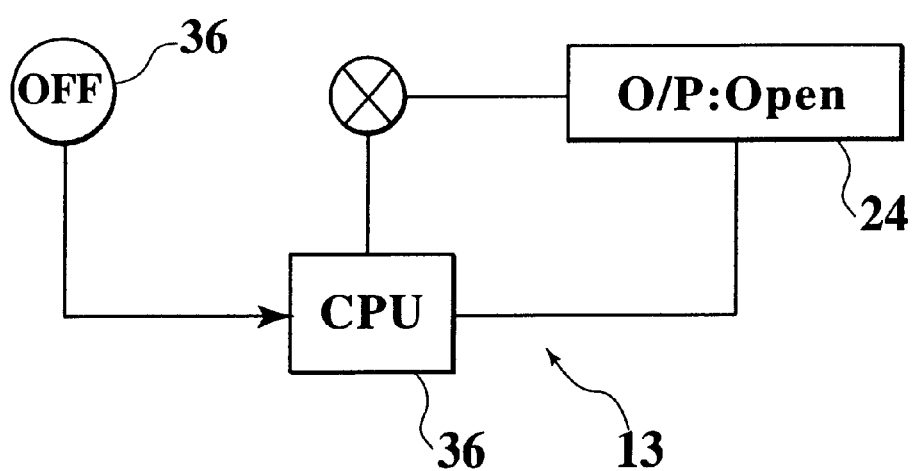
FIG. 12 is a diagram of a circuit of the control means in FIG. 10.

The engaging piece 22 put in the engaging state with the protrusion 26b of the pawl 26 is disengaged from the protrusion 26b along the moving direction of the protrusion 26b so that it becomes movable in a direction of arrow 101 shown in FIG. 11. In this way, as shown in FIG. 10, the sealing member 20 moves together with the airbag body 11 and the second exhaust port 19 is maintained in the closed state. It should be noted that a sewing force between the stitch 27 and the airbag body 11 is stronger than the urging force of the torsion spring 33 to the pawl 26.

As mentioned above, a safety system for catching or receiving an occupant in two ways is provided without large-sizing the airbag apparatus 2.

Also, the engaging piece 22 of the sealing member 20 is disposed between the cover member 12 covering the airbag body 11 and the bracket 28 rotatably supporting the pawl 26 of the control means 13. Therefore, it is unnecessary to provide an exclusive area for the engaging piece 22, so that size-reduction of the airbag apparatus 2 is made possible.

Figure 13:
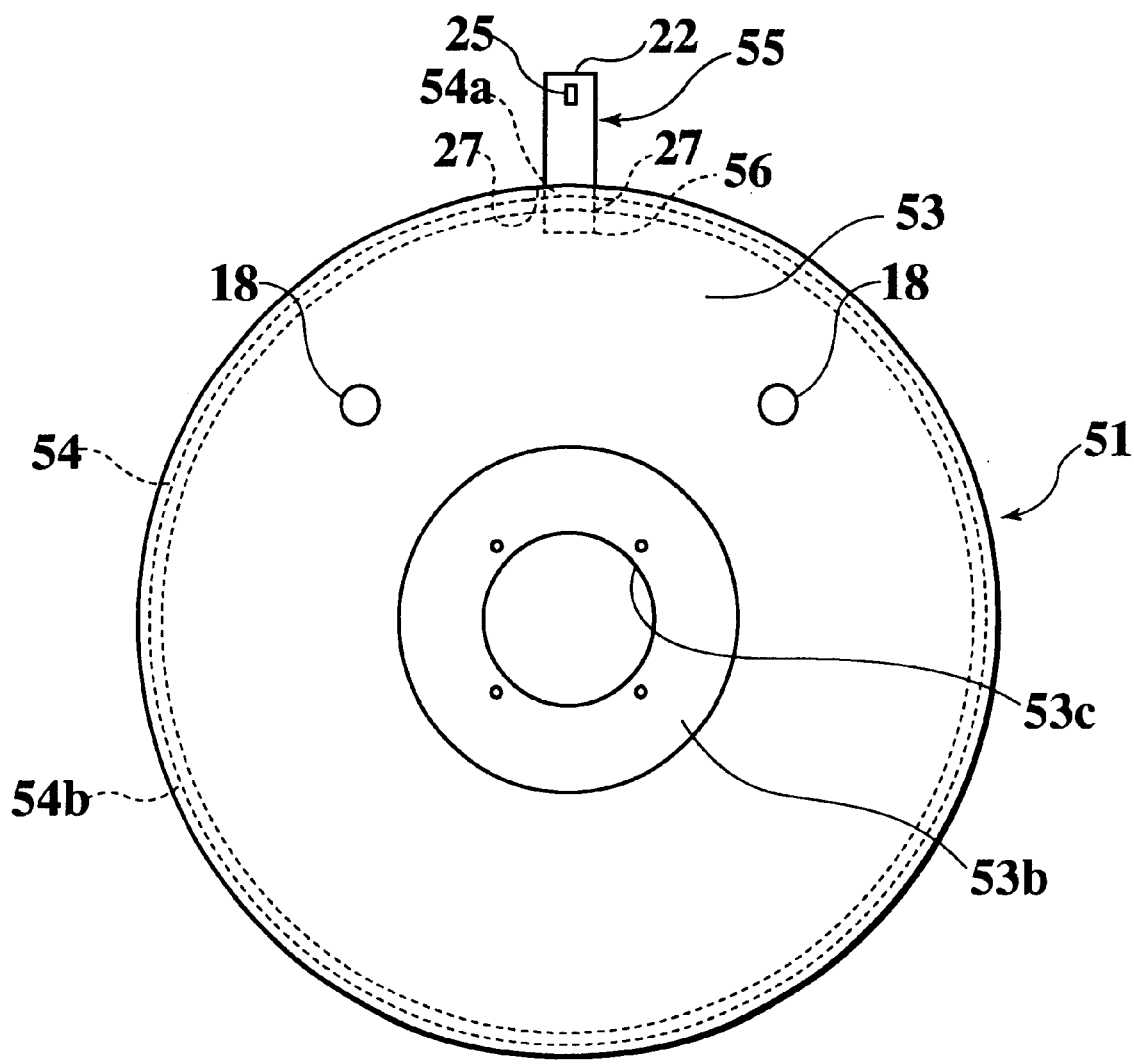
FIG. 13 is a front view of an airbag body according to a second embodiment of the present invention.
Figure 14:
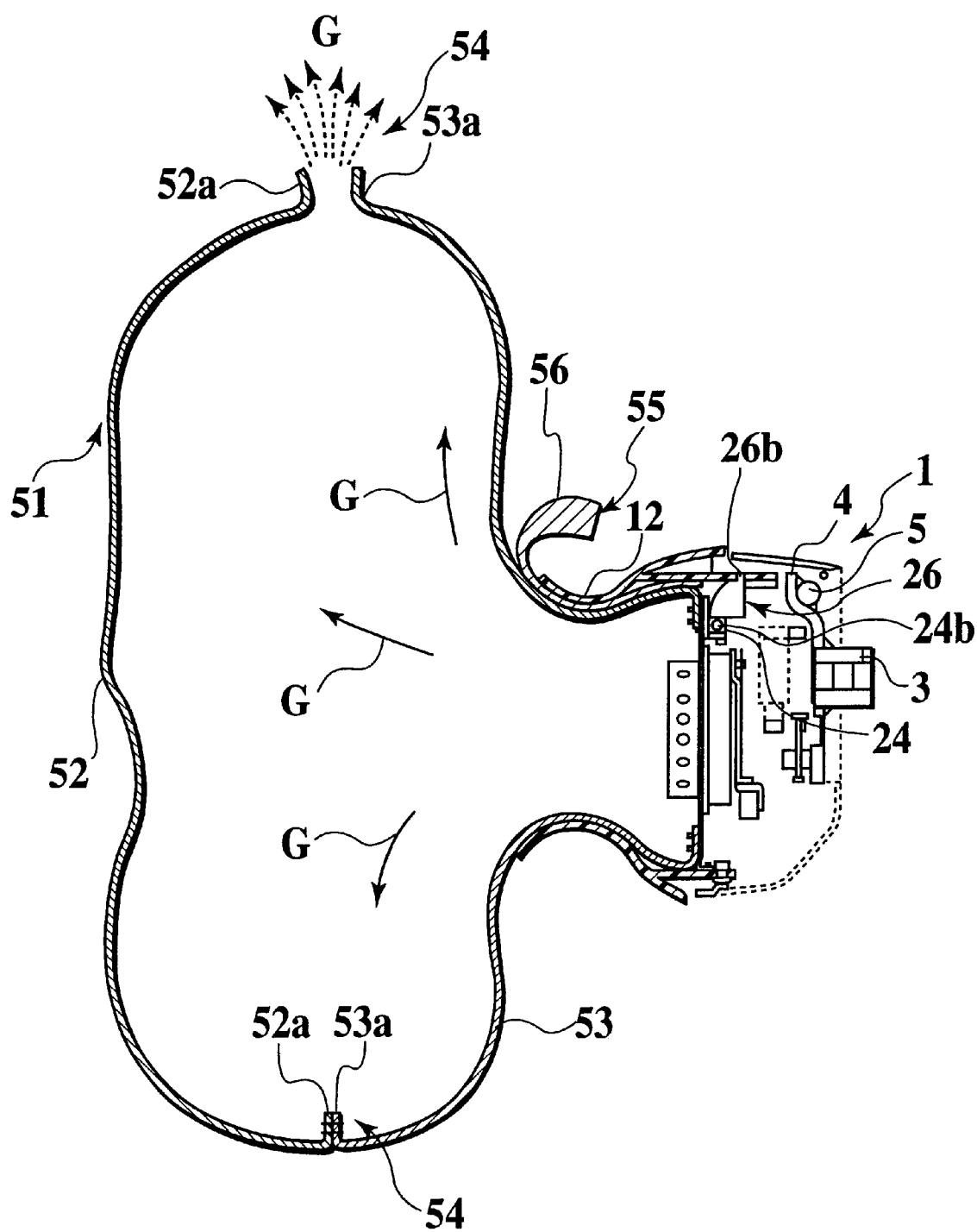
FIG. 14 is a cross section of an airbag apparatus according to the second embodiment.

FIGS. 13 and 14 show a second embodiment of the present invention. An airbag body 51 comprises a front cloth 52 and a back cloth 53, and a sewn portion 54 is formed by sewing peripheral portions 52a, 53a by a stitch 54b. In the second embodiment, a portion 54a of the sewn portion 54 is not sewn by the stitch 54b and a patch portion 56 of a sealing member 55 is supported by a stitch 27 having a sewing force smaller than that of other sewn portion 54. The engaging hole 25 of the engaging piece 22 of the sealing member 55 is positioned in the airbag apparatus 2 like the first embodiment and it is engaged with the protrusion 26b of the pawl 26.

When the airbag body 51 inflates in a state where the tongue plate is fitted into the buckle device 7a of the seatbelt apparatus 7, the sealing member 55 is locked by the pawl 26 of the airbag apparatus 2, the stitch 27 supporting the patch portion 56 of the sealing member 55 is ruptured and the sealing member 55 is separated from the sewn portion 54. Thereby, the one portion 54a of the sewn portion 54 is opened to exhaust the gas G. Namely, the one portion 54a of the sewn portion 54 serves as the second exhaust port.

When an occupant strikes on the inflated airbag body 51, the internal pressure of the airbag body 51 is increased by the striking force. However, as the gas G rapidly escapes from the first exhaust ports 18 but also the second exhaust port which is the ruptured one portion 54a of the sewn portion 54, the airbag body 51 becomes deflated appropriately from the fully inflated state. Accordingly, the occupant is received softly by the airbag body 51, so that impact of the occupant is absorbed excellently.

That is, as the one portion 54a of the sewn portion 54 formed by the rupturable stitch 27 serves as the second exhaust port, it is unnecessary to provide the second exhaust port on the airbag body 51 separately. In this way, increase in cost for forming the second exhaust port can be suppressed, and freedom for layout for the airbag body 51 is increased.

The airbag body 51 is ordinarily put in a folded state like the first embodiment. The retainer 15 disposed on the upper face 6b side of the base plate 6 has stud bolts 15a. The stud bolts 15a is inserted into an edge portion 53b of a gas introducing hole 53c of the back cloth 53 of the airbag body 51. The base plate 6 is fixed to the base plate 6 by screwing the stud bolts 15a to the nuts 17. In this state, the gas introducing hole 53c of the back cloth 53 of the airbag body 51 is pressed on to the upper face 6b of the base plate 6.

In the above embodiments, the sealing member of a belt type is shown as an example. However, the structure of the sealing member is not limited to the belt type. For example, the sealing member can be configured such that the second exhaust port is closed by the stitch itself, an engaging portion (for example, a ring-shaped engaging portion) engaged with the pawl and formed on a portion extending from the stitch, and the stitch is pulled out from the peripheral portion of the second exhaust port so that the second exhaust port is opened.

What is claimed is:

1. A safety system for an automobile, comprising:

a seatbelt apparatus for supporting a shoulder of a vehicle occupant, the seatbelt apparatus outputting a seatbelt apparatus application signal when the seatbelt apparatus is applied to the occupant;

an airbag apparatus having an airbag body, the airbag body inflating by gas introduced into the airbag body to receive the occupant and the airbag body having first and second exhaust ports for exhausting the gas;

a sealing member disposed on the second exhaust port, the sealing member being set to either one of a first state where the gas is prevented from being exhausted from the second exhaust port and a second state where the gas is allowed to be exhausted, and the sealing member being ordinarily set to the first state; and control means for controlling the sealing member so as to be set in the first state or the second state, wherein when the seatbelt apparatus is applied to the occupant, the seatbelt apparatus outputs the application signal to the control means, thereby setting the sealing member to the second state from the first state.

2. A safety system for an automobile according to claim 1, wherein the sealing member has a closing portion supported on the airbag body and closing the second exhaust port, and an engaging portion for disengageably engaging the closing portion and the control means with each other, the engaging portion in the first state is disengageable from the control means and the engaging portion in the second state is maintained in an engagement state with the control means, the engaging portion is disengaged from control means and the closing portion is maintained in a closed state of the second exhaust port when the airbag body inflates in a state where the engaging portion is in the first state, and the engaging portion is maintained in an engagement with the control means and the closing portion is separated from the second exhaust port to open the second exhaust port, when the airbag body inflates in a state where the engaging portion is in the second state.

3. A safety system for an automobile according to claim 1, wherein the second exhaust port is formed on a sewn portion disposed at a peripheral portion of the airbag body.

4. A safety system for an automobile, comprising:

a seatbelt apparatus for supporting a shoulder of a vehicle occupant;

an airbag apparatus having an airbag body, the airbag body inflating by gas introduced into the airbag body to receive the occupant and the airbag body having first and second exhaust ports for exhausting the gas;

a sealing member disposed on the second exhaust port, the sealing member being set to either one of a first state where the gas is prevented from being exhausted from the second exhaust port and a second state where the gas is allowed to be exhausted, and the sealing member being ordinary set to the first state;

control means for controlling the sealing member, wherein the seatbelt apparatus outputs a seatbelt apparatus application signal to the control means when the seatbelt apparatus is applied to the occupant, and the control means sets the sealing member to the second state when it receives the application signal;

the sealing member having a closing portion supported on the airbag body and closing around the second exhaust port, and an engaging portion for disengageably engaging the closing portion and the control means with each other;

the engaging portion in the first state being disengageable from the control means and the engaging portion in the second state being maintained in an engagement state with the control means;

the engaging portion being disengaged from the control means and the closing portion being maintained in a closed state of the second exhaust port when the airbag body inflates in a state where the engaging portion is in the first state; and the engaging portion being maintained in an engagement with the control means and the closing portion is separated from the second exhaust port to open the second exhaust port, when the airbag body inflates in a state where the engaging portion is in the second state.

5. A safety system for an automobile according to claim 4, wherein the control means has signal receiving means for receiving the seatbelt apparatus application signal and a pawl engaging with the engaging portion when the airbag body inflates in a state where the signal receiving means has received the seatbelt apparatus application signal.

6. A safety system for an automobile according to claim 4, wherein the airbag apparatus has a cover member covering the airbag body and ruptured by inflation of the airbag body, the control means has a bracket with a pawl engagable with the engaging portion, and the engaging portion is movably disposed between the cover member and the bracket.

* * * * *